United States Patent [19]

Hiesinger et al.

[11] 4,379,051
[45] * Apr. 5, 1983

[54] FILTERING APPARATUS

[75] Inventors: Edwin Hiesinger, Jenbach; Klaus Keplinger; Hermann Nessler, both of Innsbruck, all of Austria

[73] Assignee: Inkomag, Basel, Switzerland

[ * ] Notice: The portion of the term of this patent subsequent to Oct. 27, 1998, has been disclaimed.

[21] Appl. No.: 251,731

[22] Filed: Apr. 7, 1981

[30] Foreign Application Priority Data

Apr. 16, 1980 [AT] Austria .................................. 2057/80

[51] Int. Cl.³ ............................................ B01D 37/02
[52] U.S. Cl. .................................... 210/193; 210/231; 210/333.01; 210/335; 210/350; 210/446; 210/450
[58] Field of Search ............... 210/335, 193, 777, 778, 210/445, 446, 350, 231, 450, 451, 483, 332, 333.01

[56] References Cited

U.S. PATENT DOCUMENTS

| | | | |
|---|---|---|---|
| 1,720,211 | 7/1929 | Eddison | 210/770 |
| 3,098,429 | 7/1963 | Hägglund | 100/115 |
| 3,270,887 | 9/1966 | Juhasz | 210/225 |
| 3,361,261 | 1/1968 | Fairey et al. | 210/446 |
| 4,297,211 | 10/1981 | Hiesinger et al. | 210/193 |

FOREIGN PATENT DOCUMENTS

| | | |
|---|---|---|
| 233597 | 5/1964 | Austria . |
| 256886 | 9/1967 | Austria . |
| 273169 | 8/1969 | Austria . |
| 1005493 | 4/1957 | Fed. Rep. of Germany . |
| 965850 | 6/1957 | Fed. Rep. of Germany . |
| 1944438 | 4/1970 | Fed. Rep. of Germany . |
| 1805478 | 5/1970 | Fed. Rep. of Germany . |
| 1761617 | 10/1973 | Fed. Rep. of Germany . |
| 2363040 | 10/1975 | Fed. Rep. of Germany . |
| 2821768 | 10/1980 | Fed. Rep. of Germany . |
| 2124369 | 9/1972 | France . |
| 399422 | 3/1966 | Switzerland . |
| 455711 | 7/1968 | Switzerland . |
| 490879 | 7/1970 | Switzerland . |

*Primary Examiner*—Benoit Castel
*Attorney, Agent, or Firm*—Karl F. Ross; Herbert Dubno

[57] ABSTRACT

A substantially cylindrical filter chamber having a lower horizontal bottom plate, a side wall and an upper horizontal bottom plate, is divided into two compartments having a bottom plate and a side wall by a planar horizontal support fabric. In each compartment, a movable wall is associated with the bottom plate, the movable wall being adapted to reduce the volume of the respective compartment to approximately zero. The support fabric serves as a carrier for a precoat filter layer and is clamped along a ring-shaped, preferably reinforced, rim region between the adjacent faces of said side walls. Further, each movable wall is also clamped along a ring-shaped rim region between the side wall and the adjacent bottom plate of the compartment. A central channel delimited by internal side walls extends in the center of the filter chamber, an internal ring-shaped rim region of the support fabric surrounding the central opening being clamped between the adjacent faces of the internal side walls, and a ring-shaped internal rim region of the movable walls, each being clamped between the internal side wall and the bottom plate of the respective compartment, the bottom plate equally provided with a central opening.

9 Claims, 6 Drawing Figures

FILTERING APPARATUS

CROSS REFERENCE TO COPENDING APPLICATIONS

This application is related to our commonly assigned copending applications: Ser. No. 70,799 filed Aug. 29, 1979 (now U.S. Pat. No. 4,297,211) as a continuation-in-part of Ser. No. 907,628 filed May 19, 1978 (abandoned); Ser. No. 249,708 filed Apr. 1, 1981 as a division of Ser. No. 062,747; and Ser. No. 062,747 which was filed Aug. 1, 1979 as a division of Ser. No. 907,628 and which has also issued as U.S. Pat. No. 4,285,821.

FIELD OF THE INVENTION

This invention relates to an apparatus for the filtering of particles from a fluid comprising at least one substantially cylindrical filter chamber divided into two compartments by a support fabric for a precoat filter layer, the first of these compartments having at least one closable inlet opening for a carrier medium of the precoat filter layer, for the medium to be filtered and for a washing medium, the second of these compartments having a closable outlet opening for the purified filtrate.

BACKGROUND OF THE INVENTION

In such filter devices (as, for example, described in the German printed application Nos. 1 005 493, 1 761 617 or in the German open application Nos. 1 944 438, 2 363 040), so-called precoat filters, a filter-aid agent suspended in a carrier medium is applied to a support fabric in the first working phase, the filter-aid agent depositing as a filter layer in the first compartment, while the carrier medium enters into the second compartment and exits again.

In a second working phase, the filtering phase, the medium to be filtered and contaminated with solid particles is introduced into the first compartment. The medium traverses the filter-aid layer, is conveyed into the second compartment as a pure filtrate and again removed from said second compartment. The solid particles deposit on the filter-aid layer which becomes increasingly clogged during this working phase. The third phase is the cleaning phase in which the filter layer is backwashed from the support fabric together with the contaminants and removed from the first compartment by a washing medium. So-called cartridge filters are frequently used as a filter device in which a partition of the substantially cylindrical filter chamber is obtained by filter cartridges which are parallel to the axis and closed on one side. They are inserted into a radially arranged intermediate plate. The filter cartridges—which are tube-shaped support fabrics—have a large filter surface but because of their orientation they are difficult to clean.

A further prior art filter device of this kind has been described in the German Pat. No. 965,850. It is of similar structure but no filter cartridges are provided in the filter chamber. A substantially star-shaped support fabric surrounds a central tube and separates the two compartments from each other. In addition to the afore-described openings in the two compartments, the central tube forms a further closable outlet opening from the second compartment which serves for the backwashing of the carrier medium during the precoat phase.

Beside such precoat filters, in which the cleaning should be carried out automatically, filter presses have been used. They do, in the first place, not serve for the cleaning of a medium to be filtered but, above all, for the recovery of the filter cake. Hence, they are no precoat filters as a filter-aid agent is not desired. They have a number of adjacently or superjacently arranged filter chambers which are provided with filter cloths. Walls movable under pressure, membranes in particular, are used for pressing the filter cake. Such filter presses have, for example, been described in Austrian Pat. Nos. 233,597, 256,866, 273,169, in the German open application No. 1 805 478, in the Swiss Pat. Nos. 399,422 and 490,879 or in U.S. Pat. Nos. 3,098,429 and 3,270,887. All of the afore-mentioned filter presses have to be disassembled for removing the filter cake, whereby the individual filter plates have to be spaced from one another by such a distance that the filter cake can be removed parallel to the planar filter cloth perpendicularly to the longitudinal axis.

One or two filter cloths may be arranged in one filter chamber, and one movable wall is provided for each filter cloth, the wall being adapted to be pressed against the filter cloth. The filter cloth and its movable wall may be arranged on different filter frames. It has proved advantageous, however, to provide only one filter frame for each filter chamber, whereby the filter cloth is fixed directly to the movable wall, the wall being provided with grooves or the like for the removal of the filtrate.

Finally, the German open application No. 2 821 768 (see also U.S. Pat. Nos. 4,285,821 and 4,297,211) describes a precoat filter having a filter chamber of square cross-section. The filter chamber is divided into two compartments by a partition wall, e.g. a grid, having through openings. The support fabric is fixed to the partition wall which is preferably divided into two exchangeable grid inserts, each comprising one part of the support fabric. The partition wall serves as a support for the support fabric in order to reduce as far as possible the non-uniform strain working on the filter cloth during filtration, which is due to the square cross-section. Moreover, the system of German application No. 2 821 768 employs a movable wall in each compartment for changing the volume, whereby first, the filter cake is pressed and, second, the filter chamber can be entirely discharged between two working phases so that the mixture of residues of different media is eliminated.

OBJECT OF THE INVENTION

It is, therefore, the object of this invention to provide a precoat filter of the above-described kind with a substantially cylindrical filter chamber having the advantages of the above-cited filter device of German open application No. 2 821 768 (U.S. Pat. Nos. 4,285,821 and 4,297,211) in which the arangement of an individual partition wall with a through opening serving as a support for the support fabric may not be required.

SUMMARY OF THE INVENTION

According to this invention, this is achieved by dividing the filter chamber into two axially symmetric compartments by means of the support fabric, by adapting the support fabric to be planar and to be clamped along a ring-shaped rim region between the side walls of the two compartments, and further by delimiting each compartment parallel to the support fabric by a movable wall adapted to be pressed against the support fabric by means of external pressure.

As the two compartments are axially symmetric and the support fabric is clamped along the ring-shaped rim region the support fabric is exposed to substantially uniform strain during filtration. This is due to the fact that during the precoating of the filter-aid layer as well as during the deposition of the particles to be separated from the medium to be filtered a substantially uniform distribution of pressure on the filter surface of the support fabric is obtained. In places where an increased deposition of particles would occur the flow rate is reduced and, hence, the increase in particles is reduced as well. Therefore the number of particles increases in places with reduced deposition.

A preferred embodiment provides that each movable wall is clamped along a ring-shaped rim region between the side wall and the bottom plate of the compartment. Thus, each movable wall is exposed to substantially uniform strain, too.

If the filter device has a central channel formed by an internal side wall the support fabric as well as the two movable walls, each, are provided with a central opening, the support fabric being clamped along a ring-shaped internal rim region between the internal side walls of the two compartments forming the central channel, and each movable wall being along a ring-shaped internal rim region between the internal side wall and the bottom plate of the compartment.

The internal side wall of the first compartment may be provided with openings forming the closable outlet opening for the washing medium, the central channel serving as discharge means. For increasing the resistance to tear of the support fabric, it is further preferably provided to arrange at least the reinforcing ring in each ring-shaped rim region of the support fabric. Each reinforcing ring may at the same time serve as a washer and, in this case, be inserted into an annular groove in the front face of the side wall of a compartment.

BRIEF DESCRIPTION OF THE DRAWING

In the following a preferred embodiment of the invention will be described in greater detail by means of the figures of the drawing without being limited thereto.

SPECIFIC DESCRIPTION

The filter device according to the invention comprises an axially symmetric, substantially cylindrical filter chamber 1 which is divided into two axially symmetric compartments 2, 3 by means of a planar support fabric 4. Each compartment 2, 3 is laterally closed by side walls 7, 8 towards the outside and parallel to the supporting fabric 4 movable walls 11, 12, preferably by membranes. The side walls 7, 8 are arranged on respective bottom plates 17, 18. Internal side walls 9, 10 surround a central channel 22 in alignment with central openings 23, 24 in the bottom plate 17, 18.

The support fabric 4 and the movable walls 11, 12 are also provided with central openings 19, 20 and 21. The support fabric 4 is reinforced in the external ring-shaped rim region 5. In the present embodiment, the reinforcement is effected by a reinforcing ring 26 which also serves as a washer and engages in annular grooves 28 in the adjacent faces of the external side walls 7, 8. The internal ring-shaped rim region surrounding the central opening 19 is also reinforced in the same manner. A reinforcing ring 27, which also serves as a washer, engages in annular grooves 29 in the adajcent faces of the internal side walls 9, 10.

The following means are provided for joining the individual parts of the filter device: an external annular groove 48 and an annular shoulder 51 surrounding the central opening 24 in the surface of the bottom plate 18, a recess 50 in the external side wall 7 of the first or upper compartment 2, one annular flange 49, each, on the upper and lower surface of said side wall 7, an annular ring 54 on the lower side of the internal side wall 10, an annular ring 53 on the upper surface of the internal side wall 9, an external annular groove 47 and an annular shoulder 52 surrounding the central opening 23 in the lower surface of the bottom plate 17.

As preferably several filter chambers are stacked the external sides of the two bottom plates 17, 18 are also provided with annular grooves 47 and 48, respectively, as well as with annular shoulders 51 and 52, respectively, so that one bottom plate only is required between two filter chambers.

When assembling the individual parts, the lower movable wall 12 is arranged on the bottom plate 18 in such a manner that the central openings 21 and 24 coincide. The internal side wall 10 of the second or lower compartment 3 is arranged to engage with its annular ring 54 the annular shoulder 51 of the bottom plate 18. After positioning the external side wall 8 of the lower compartment 3 on the ring-shaped rim region 14 of the movable wall 12, the support fabric 4 is arranged thereon, and the reinforcing rings 26, 27 are placed to engage the annular grooves 28, 29 of the side walls 8, 10. Thereby the annular flange 49 engages at the lower surface the annular groove 48 of the bottom plate 18, and the reinforcing ring 26 engages the annular groove 28 provided in the recess 50 of the external side wall 7 receiving the external wall 8 of the second compartment 3. Then, the internal side wall 9 of the first compartment 2 is pushed on the reinforcing ring 27 of the support fabric 4, said reinforcing ring then being positioned in the annular groove 29. The upper movable wall 11 can now be inserted between the annular flange 49 of the external side wall 7 and the annular ring 53 of the internal side wall 9. Finally, the bottom plate 17 can be placed thereon, the annular flange 49 and the annular ring 53 engaging the annular groove 47 and the annular shoulder 52, respectively. The parts superjacently arranged in the afore-described manner are then pressed together by clamping means, whereby the support fabric 4 is clamped between the two external and internal side walls 7, 8 and 8, 10, respectively, the movable wall 11 between the side walls 7, 9 of the first compartment 2 and the bottom plate 17, and the movable wall 12 between the side walls 8, 10 of the second compartment 3 and the bottom plate 18.

Such clamping means are, for example, two clamping plates drawn together by means of a clamping screw extending through the central channel 22. A number of bores arranged on the circumference parallel to the axis through which clamping screws extend may also be provided as clamping means.

On the bottom plates 17, 18 as well as on the external side wall 7, four outwardly extending projections 30, 31, 32 are provided through which the feeding—and discharge pipes run. In the illustrated embodiment, as can particularly be seen in FIG. 2, two pipes are provided in two projections, each, and three pipes in the other two projections. The pipes are preferably arranged as follows: In the projection 32, which is on the right in FIG. 2, the central pipe is a feeding pipe 45 for the pressure medium, e.g. compressed air, to be fed to the movable wall 12. As can be seen in FIG. 3, a stub pipe branches off the feeding pipe 45 into the bottom plate 18, the inlet opening 38 of said stub pipe being arranged below the movable wall 12. By introducing the pressure medium, the movable wall 12 is lifted and pressed against the lower side of the support fabric 4. In the right projection of FIG. 2, a feeding pipe 40 for the carrier medium of the filter-aid agent or a feeding pipe 41 for the medium to be filtered are further provided.

Figure 4:
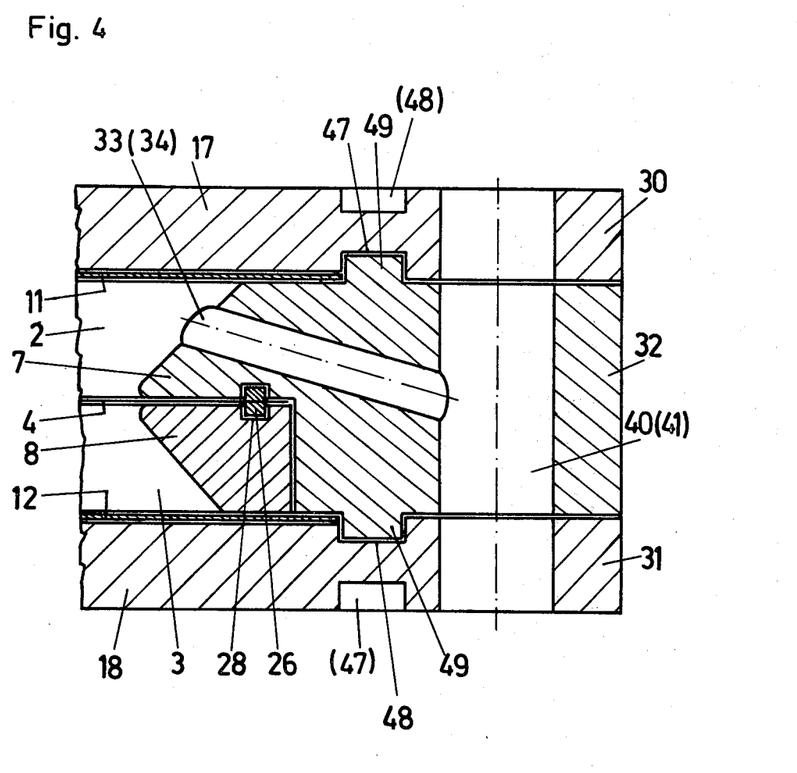

As can be seen in FIG. 4, a stub pipe branches from the feeding pipe 40, 41 diagonally upwards, the inlet openings 33 and 34 leading into the first compartment 2. Each inlet opening may be divided into slots splitting up the inflow. The feeding pipe 42 for the washing medium also extends through the right projection 32 of FIG. 2. Again, a stub pipe branches off said feeding pipe 42, the inlet opening 35 of said stub pipe also leading into the first compartment 2.

Figure 1:
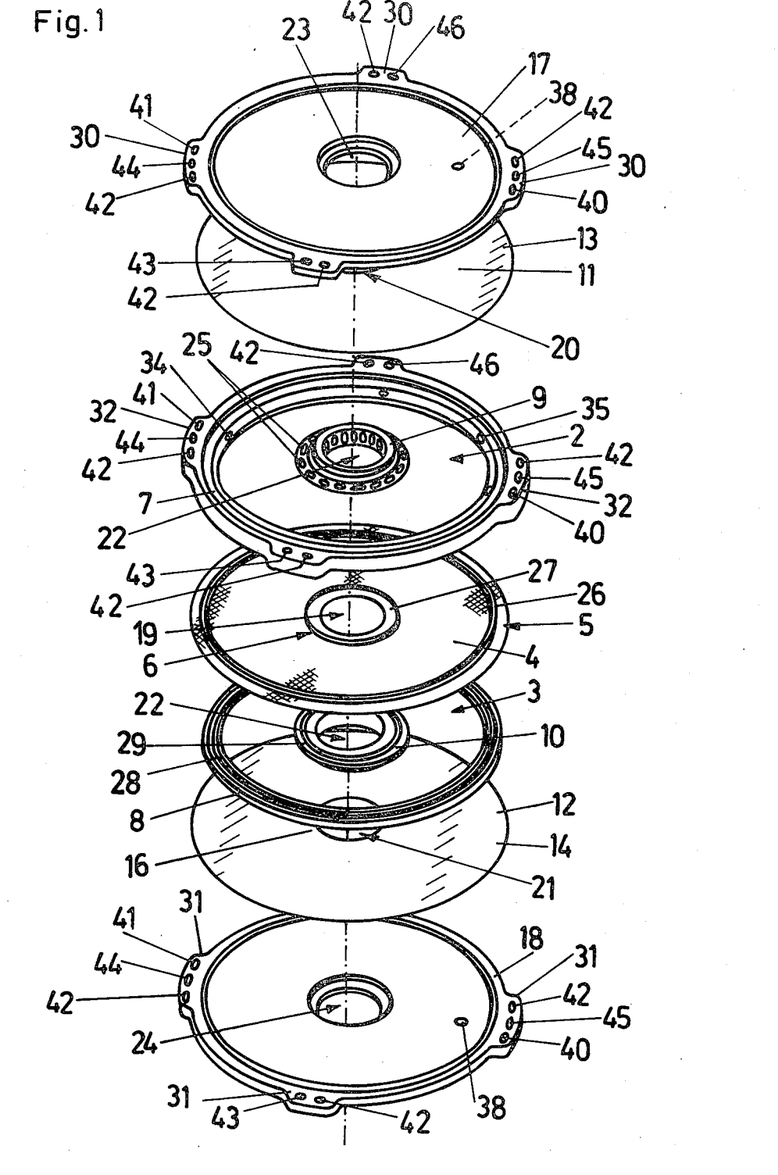
FIG. 1 is an exploded view of a preferred embodiment of the filter device according to the invention.
Figure 2:
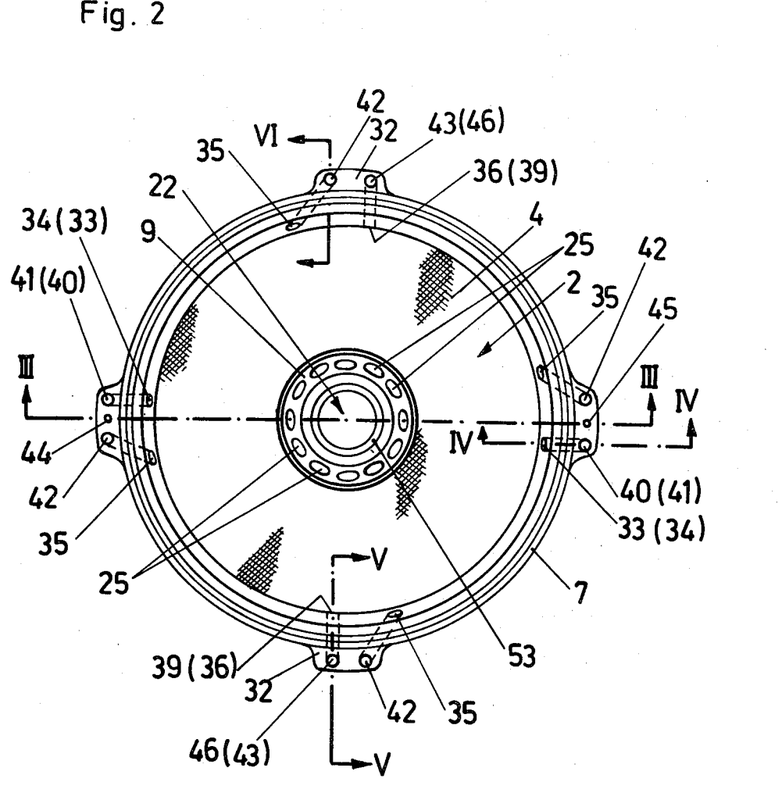
FIG. 2 is a top view of the opened filter chamber.
Figure 3:
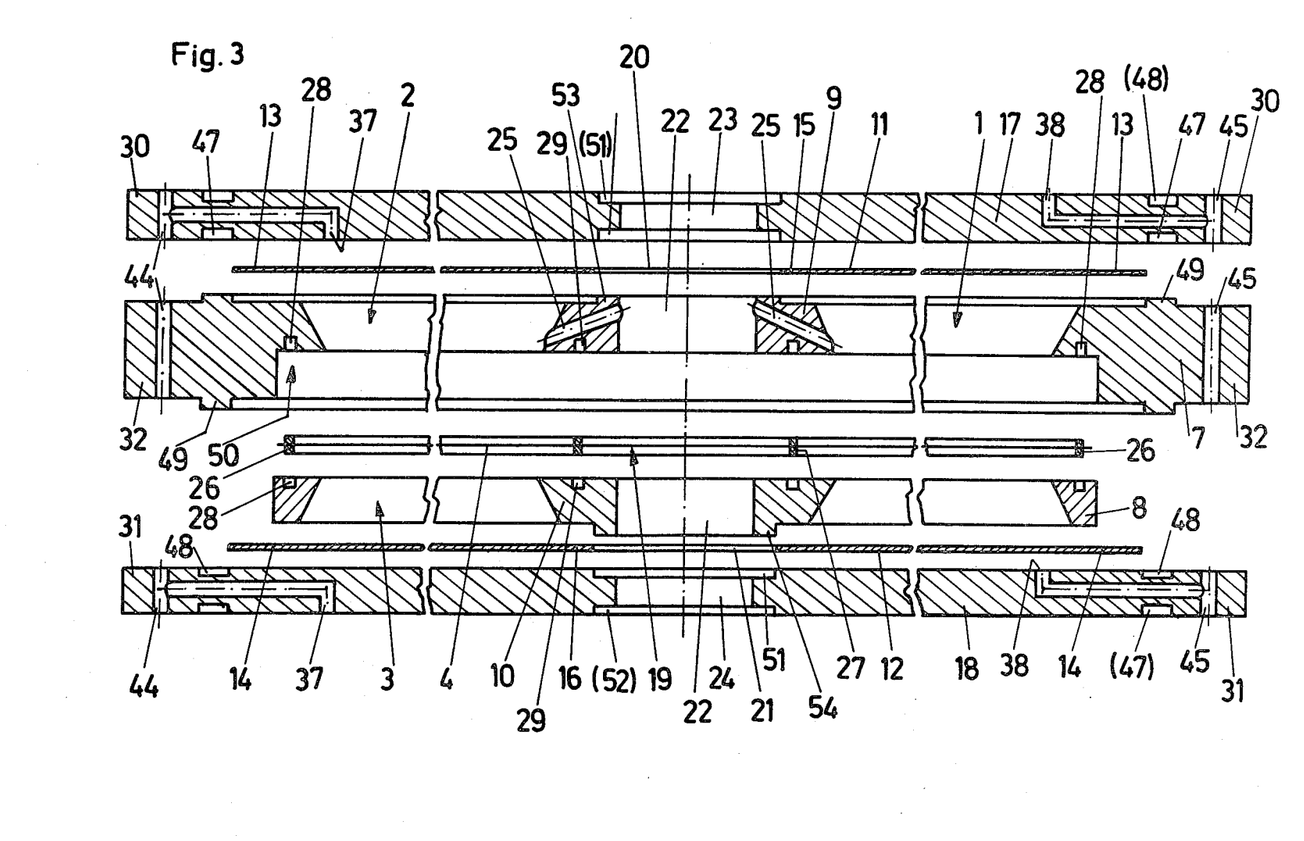
FIG. 3 is an axial sectional view along the line III—III of FIG. 2 in the representation according to FIG. 1, and FIGS. 4 through 6 are respective sectional views along the lines IV—IV, V—V and VI—VI of FIG. 2.

Two pipes run through the lower projection 32 of FIG. 2. First, a feeding pipe 42 for the washing medium extends therethrough, the stub pipe of said feeding pipe 42 leading into the first compartment 2 by means of the inlet opening 35. Second, the projection 32 also receives the discharge pipe 46 for the purified filtrate exiting from the second compartment 3 through an outlet opening 39 and flowing into the discharge pipe 46 via a stub pipe.

In the left projection 32 of FIG. 2, three pipes are provided. A feeding pipe 44 for the pressure medium acting upon the movable wall 11. As can be seen in FIG. 3, the pressure medium enters between the bottom plate 17 and the movable wall 11 via a stub pipe in the bottom plate 17 through the inlet opening 37, thus, moving the wall 11 downwards to the support fabric 4. The second pipe provided therein is a feeding pipe 42 for the washing medium as well as a feeding pipe 41 for the medium to be filtered.

The feeding pipe 41 may also serve as a feeding pipe 40 for the carrier medium of the filter-aid agent. Said two feeding pipes 40, 41 may be interchangeable; one of said two pipes may not be required if the purified filtrate is employed as a carrier medium.

Figure 5:
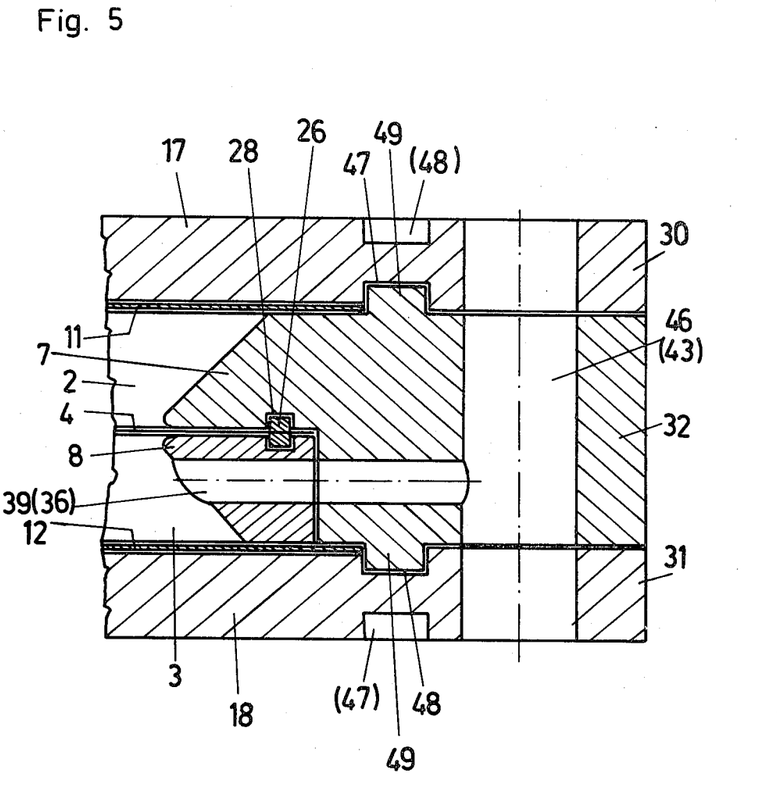
Figure 6:
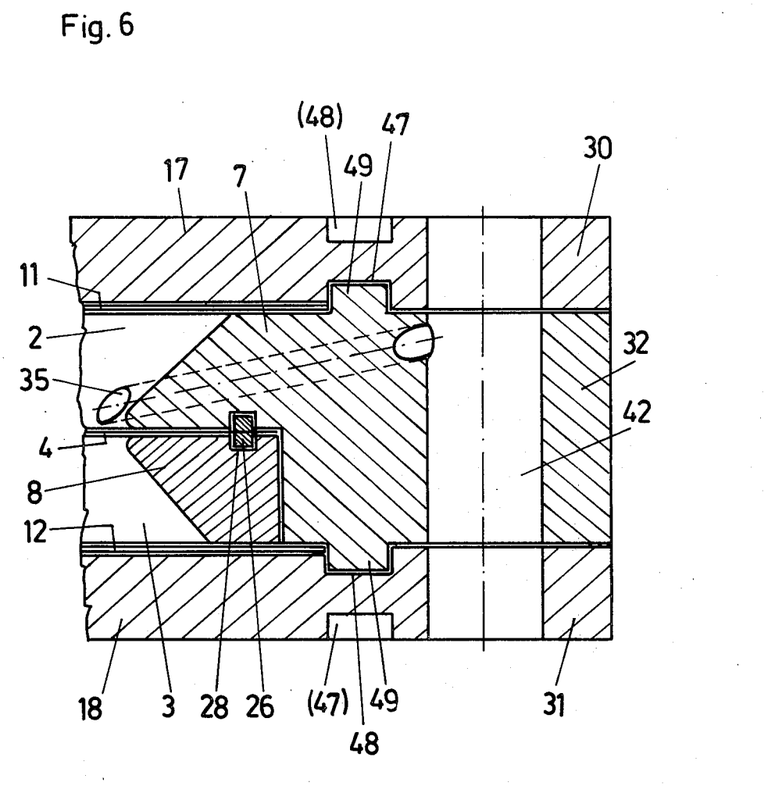

Finally, two further pipes extend through the upper projection of FIG. 2. The first of said pipes is a feeding pipe 42 for the washing medium, the washing medium flowing via a stub pipe through the outlet opening 35 into the first compartment 2. A sectional view thereof is shown in FIG. 6, all afore-mentioned feeding pipes 42 for the washing medium and the stub pipes being equally designed in the other projections 32. The stub pipe runs diagonally from the top towards the bottom, and the outlet opening 35 leads into the first compartment 2 closely above the support fabric 4. It does not run, however, in direction of the central channel 22, as the stub pipes of the feeding pipes for all other media do, but as tangentially as possible to the filter surface. This is of advantage as the washing medium entering through four stub pipes extending in the afore-described manner moves substantially spirally over the surface of the support fabric 4 so that a through cleaning is obtained. The washing medium can then together with the contaminated filter-aid layer be discharged through the openings 25 into the central channel 22. A preferred washing medium is a combination of water and air, which is diametrically opposite fed into the first compartment 2. In the upper projection 32 of FIG. 2, a feeding pipe 43 for the washing medium is provided, said feeding pipe 43 leading into the second filter chamber 3 via its stub pipe through the inlet opening 36. The arrangement and design correspond to those of the discharge pipe 46 of the purified filtrate illustrated in FIG. 5. Hence, these two pipes are also interchangeable.

All inlet- and outlet openings and feeding- and discharge pipes, including the through openings 25 into the central channel, are, for example, individually closable by valves, which have, however, been omitted as they are not subject of the present invention. Several filter chambers are adapted to be stacked, whereby the individual pipes 40 through 46 and the central channels 22 complement one another for feeding and discharging the filter chambers. As all filter chambers are clamped by a common clamping means simple washers, which have not been illustrated, provide sufficient sealing between the pipes and all projections 30, 31.

The movable walls 11, 12 may, as they are preferably formed by membranes, be partially reinforced by punched disks or the like which are inserted into the annular central part. They may also be fixed to the bottom plate 17, 18 in their external ring-shaped rim regions.

The filter device according to the invention operates as follows: The filter-aid agent, which is suspended in a carrier medium, is fed to the first compartment via the feeding pipe 40 (or 41). The filter-aid agent, preferably cellulose fibers, produces the filter layer on the support fabric 4, while the carrier medium flows into the second compartment 3. If the carrier medium is a pure filtrate it is discharged via the discharge pipe 46; if it is a different medium it can flow through the pipe 43. In the latter case, both movable walls 11, 12 are moved towards the support fabric 4 after precoating so that the filter chamber is entirely emptied. The medium to be filtered is discharged from the second compartment via the feeding pipe 46. If it is a valuable medium, the filter cake on the filter layer can be pressed out through the movable wall 11 after filtration, and subsequently, the second compartment 3 can be emptied through the movable wall 12. For the cleaning operation, the movable wall 12 remains in contact with the support fabric 4, and the washing medium is fed to the first compartment 2 via the feeding pipe 42 and discharged therefrom via the central channel 22. If backwashing is desired, a washing medium can additionally be fed to the second compartment 3 via the feeding pipe 43, said washing medium backwashing the support fabric 4 and being discharged from the first compartment 2 into the central channel 22. After purification, both movable walls are again pressed on the support fabric 4. Hence, the filter chamber 1 is entirely emptied, and precoating starts again. The central channel 22 need not be provided so that the filter surface of the support fabric is a complete circle. In such case, discharge pipes for the washing medium may be provided in one or several of the projections 30, 31, 32, the stub pipes of said discharge pipes leaving from the first compartment 2.

What is claimed is:

1. An apparatus for the filtering of particles from a fluid comprising at least one substantially cylindrical filter chamber divided into two compartments by an annular circular support fabric for a precoat filter layer, the first of said compartments having at least one closable inlet opening for a carrier medium of the precoat filter layer, at least one closable inlet for the medium to be filtered and at least one closable inlet for a washing medium, the second of said compartments having a closable outlet opening for the purified filtrate, wherein said filter chamber is divided into two axially symmetric compartments by means of said support fabric, wherein said support fabric is planar and clamped along a reinforced outer ring-shaped rim region of said two compartments and a reinforced inner periphery between a pair of rings defining a central channel through said compartments and said fabric, and wherein each of said compartments is delimited parallel to said support fabric by a movable wall adapted to be pressed against said support fabric by means of external pressure, respective bottom plates flanking the assembly of said movable walls and said fabric and annular side walls surrounding said compartments and clamping said rim region of said fabric.

2. An apparatus according to claim 1, wherein each of said movable walls is clamped along ring-shaped rim regions between said side walls and said bottom plates of said compartments.

3. An apparatus according to claim 1, wherein at least one reinforcing ring is arranged in said ring-shaped rim region of said support fabric, said reinforcing ring being inserted in annular grooves in the adjacent faces of said side walls of said compartments.

4. An apparatus for the filtering of particles from a fluid comprising at least one substantially cylindrical filter chamber divided into two compartments by a support fabric for a precoat filter layer, the first of said compartments having at least one closable inlet opening for a carrier medium of the precoat filter layer, a closable inlet for the medium to be filtered and a closable inlet for a washing medium, the second of said compartments having a closable outlet opening for the purified filtrate, wherein said filter chamber is divided into two axially symmetric compartments by means of said support fabric, wherein said support fabric is planar and clamped along a ring-shaped rim region of said two compartments, and wherein each of said compartments is delimited parallel to said support fabric by a movable wall adapted to be pressed against said support fabric by means of external pressure, respective bottom plates flanking the assembly of said movable walls and said fabric and annular side walls surrounding said compartments and clamping said rim region of said fabric, a central channel formed in the filter chamber, said channel being formed by an internal side wall, wherein said support fabric and said two movable walls, each, have a central opening, said support fabric being clamped along a ring-shaped internal rim region between said internal side walls of said two compartments forming said central channel, and each of said movable walls being clamped along a ring-shaped internal rim region between said internal side walls and said bottom plates of said compartments.

5. An apparatus according to claim 4, wherein said internal wall of said first compartment has openings forming the closable outlet opening for the washing medium.

6. An apparatus according to claim 4, wherein at least one reinforcing ring is arranged in said ring-shaped internal rim region of said support fabric, said reinforcing ring being inserted in annular grooves in the adjacent faces of said internal side walls of said compartments.

7. A filtering apparatus comprising:
an axially aligned cylindrical stack of filtering units, each of said units comprising:
a pair of generally circular bottom plates, each of said bottom plates being formed with at least one passage for a first fluid medium,
respective movable walls juxtaposed with said bottom plates and displaceable toward one another upon introduction of said first medium through said passages,
respective annular members each formed with at least one passage and disposed in axial registry between said bottom plates to define annular side walls of respective circular compartments, said compartments being closed on opposite axial ends by said movable walls, and
a circular support fabric clamped between said members and separating said compartments from one another;
clamping means for drawing said stack together and clamping for each of said units respective bottom plates against the respective members and the respective members against a respective support fabric; and
means connected to said passages for:
(a) introducing a filter aid in a second medium into one of the compartments of each unit for deposition of said filter aid as a layer on the respective fabric,
(b) withdrawing said second medium from the other compartment,
(c) introducing a medium to be filtered into said one of said compartments of each unit,
(d) withdrawing a filtrate from the other compartment of each unit,
(e) introducing said first medium into each unit to press a filtered mass against said fabric, and
(f) introducing a back washing medium into the other compartment of each unit while discharging a back washed suspension from said one compartment of each unit.

8. The filtering apparatus defined in claim 7 wherein said plates, said movable walls and said fabric are all annular and said members include a central element engaging said fabric around a central hole therein, and peripheral elements engaging said fabric along the outer periphery thereof, each of said elements being formed with annular grooves open toward said fabric, said fabric being formed with reinforcing beads around its outer periphery and around said hole, said beads being received in said grooves.

9. The filtering apparatus defined in claim 7 or claim 8 wherein each of said bottom plates is formed with an annular recess open toward the other bottom plate and said members have annular projections received in said recess.

* * * * *